United States Patent
Okamoto et al.

(10) Patent No.: US 8,573,088 B2
(45) Date of Patent: Nov. 5, 2013

(54) MECHANISM FOR CONVERTING ROTATIONAL MOTION TO LINEAR MOTION

(75) Inventors: Yoshio Okamoto, Omitama (JP); Kenji Hiraku, Kasumigaura (JP); Isamu Tsubono, Ushiku (JP)

(73) Assignee: Hitachi, Ltd., Tokyo (JP)

( * ) Notice: Subject to any disclaimer, the term of this patent is extended or adjusted under 35 U.S.C. 154(b) by 327 days.

(21) Appl. No.: 13/160,574

(22) Filed: Jun. 15, 2011

(65) Prior Publication Data

US 2011/0303030 A1 Dec. 15, 2011

(30) Foreign Application Priority Data

Jun. 15, 2010 (JP) ................................. 2010-136418

(51) Int. Cl.
*F16H 1/18* (2006.01)

(52) U.S. Cl.
USPC ............ 74/424.92; 74/424.9; 74/458; 74/462

(58) Field of Classification Search
USPC ................. 74/424.92, 424.91, 424.9, 424.71, 74/89.26, 457, 458, 462
See application file for complete search history.

(56) References Cited

U.S. PATENT DOCUMENTS

| | | | |
|---|---|---|---|
| 3,406,584 A * | 10/1968 | Roantree | 74/424.92 |
| 3,434,357 A * | 3/1969 | Roantree | 74/25 |
| 3,508,452 A * | 4/1970 | Roantree | 74/424.7 |
| 3,585,869 A * | 6/1971 | Lemor | 74/424.92 |
| 3,726,151 A * | 4/1973 | Lemor | 74/424.92 |
| 3,744,332 A * | 7/1973 | Nilsson | 74/424.92 |
| 3,884,090 A * | 5/1975 | Dock | 74/424.92 |
| 3,965,761 A * | 6/1976 | Stanley | 74/424.92 |
| 4,048,867 A * | 9/1977 | Saari | 74/424.92 |
| 4,526,053 A * | 7/1985 | Carson | 74/424.92 |
| 4,576,057 A * | 3/1986 | Saari | 74/424.92 |
| 4,615,229 A * | 10/1986 | Granbom | 74/424.92 |
| 4,648,285 A * | 3/1987 | Carson | 74/424.92 |
| 4,884,466 A * | 12/1989 | Duruisseau | 74/424.92 |
| 4,926,708 A * | 5/1990 | Dietrich et al. | 74/424.75 |
| 4,964,314 A * | 10/1990 | Wilkes | 74/424.92 |
| 5,809,837 A * | 9/1998 | Shaffer | 74/424.92 |
| 5,836,208 A * | 11/1998 | Dietrich et al. | 74/424.92 |
| 6,098,479 A * | 8/2000 | Hoermansdoerfer | 74/424.92 |

(Continued)

FOREIGN PATENT DOCUMENTS

| | | |
|---|---|---|
| JP | 2007-120659 | 5/2007 |
| JP | 2011-74982 | 4/2011 |

*Primary Examiner* — David M Fenstermacher
(74) *Attorney, Agent, or Firm* — Antonelli, Terry, Stout & Kraus, LLP.

(57) ABSTRACT

A rotational-to-linear conversion mechanism inhibits interference from occurring in places except for an engagement site to increase the efficiency of conversion mechanism and reliability, which has: a rack rod 1 including thread on its outer peripheral face; a holder member 3 provided on the outer periphery of the rack rod, rotating about the rack rod and moving in the axis direction; and revolving rollers 21 rotatably supported in the holder member, each having ring-shaped grooves formed in its outer peripheral face to be engaged with the thread, and placed at an axis angle with respect to a center axis of the rack rod to allow the ring-shaped grooves to be engaged with the thread on the rack rod. A contact face of the thread with each ring-shaped groove in an engagement site of the thread and the ring-shaped groove is formed as a convex face having different curvatures in a radial direction.

8 Claims, 9 Drawing Sheets

(56) References Cited

U.S. PATENT DOCUMENTS

| | | | |
|---|---|---|---|
| 6,131,479 A * | 10/2000 | Butsch et al. | 74/424.92 |
| 6,170,351 B1 * | 1/2001 | Zernickel | 74/424.92 |
| 6,370,978 B1 * | 4/2002 | Dietrich et al. | 74/424.92 |
| 7,000,495 B2 * | 2/2006 | Benoit | 74/424.92 |
| 8,082,818 B2 * | 12/2011 | Sugitani | 74/424.91 |
| 2004/0244520 A1 * | 12/2004 | Cornelius et al. | 74/424.92 |
| 2005/0160856 A1 * | 7/2005 | Sugitani | 74/424.92 |
| 2010/0269616 A1 * | 10/2010 | Merlet et al. | 74/424.92 |
| 2011/0072928 A1 * | 3/2011 | Seto et al. | 74/424.92 |
| 2011/0193500 A1 | 8/2011 | Seto et al. | |

\* cited by examiner

US 8,573,088 B2

MECHANISM FOR CONVERTING ROTATIONAL MOTION TO LINEAR MOTION

BACKGROUND OF THE INVENTION (i) Field of the Invention

This invention relates to a rotational-to-linear motion conversion mechanism and, more particularly, to a rotational-to-linear motion conversion mechanism enabling suppression of interference in an engagement area for an improvement in reliability.

(ii) Description of the Related Art

A known one of the rotational-to-linear motion conversion mechanisms of mutually converting the motion direction between the rotational motion and the linear motion includes: a rack rod having a thread formed on the outer peripheral surface; a holder member provided rotatably and movably in the axial direction relative to the rack rod; and a revolving roller that is rotatably supported in the holder member and has a ring-shaped groove formed in the outer peripheral surface to engage with the thread and additionally is placed at an axial angle equal to or greater than the lead angle of the thread with respect to the axis of the rack rod.

In this mechanism the tangent planes of the thread and the ring-shaped groove in the engagement site to each other are perpendicular to the axis of the revolving roller, and the surfaces of them in the engagement site are curved with respect to each other, thus enabling suppression of interference in places except the predetermined engagement site to produce high thrust. Such a mechanism is disclosed in, for example, JP-A No. 2007-120659.

JP-A No. 2007-120659 discloses the curved faces of the thread and the ring-shaped groove in the engagement site, but does not describe the shape of the curved face in detail. Merely forming the curved faces in the engagement site leads to a reduction in conversion efficiency. This is because, for example, when a great load is applied to the mechanism, deformation appears in the engagement site, which increases the area of the contact face (multi-point contact), causing induction of slip. Once slip is produced, the engagement face is roughened, further inducing slip.

SUMMARY OF THE INVENTION

The present invention has been made in view of the above circumstances and provides a rotational-to-linear motion conversion mechanism with increased efficiency of conversion mechanism and increased reliability by suppression of interference in places except an engagement set site.

To attain this, the present invention employs the following technique.

An embodiment of the present invention provides a rotational-to-linear motion conversion mechanism having: a rack rod including thread formed on its outer peripheral face; a holder member provided on the outer periphery of the rack rod, rotating about the rack rod and moving in the axis direction; and revolving rollers rotatably supported in the holder member, each having ring-shaped grooves formed in its outer peripheral face to be engaged with the thread, and placed at an axis angle with respect to a center axis of the rack rod to allow the ring-shaped grooves to be engaged with the thread formed on the rack rod. In the mechanism, a contact face of the thread with each of the ring-shaped grooves in an engagement site of the thread and the ring-shaped groove is formed as a convex face having different curvatures in a radial direction.

According to the embodiment of the present invention, because of this structure, the interference occurring in sites except an engagement site in the rotational-to-linear conversion mechanism is suppressed, resulting in an increase in efficiency of conversion mechanism and an improvement in reliability.

BRIEF DESCRIPTION OF THE DRAWINGS

Embodiments of the present invention will be described in detail based on the following drawings, wherein.

DETAILED DESCRIPTION OF THE INVENTION

An embodiment will be described below with reference to the accompanying drawings. First, a rotational-to-linear motion conversion mechanism is described based on FIG. 1 to FIG. 8.

Figure 1:
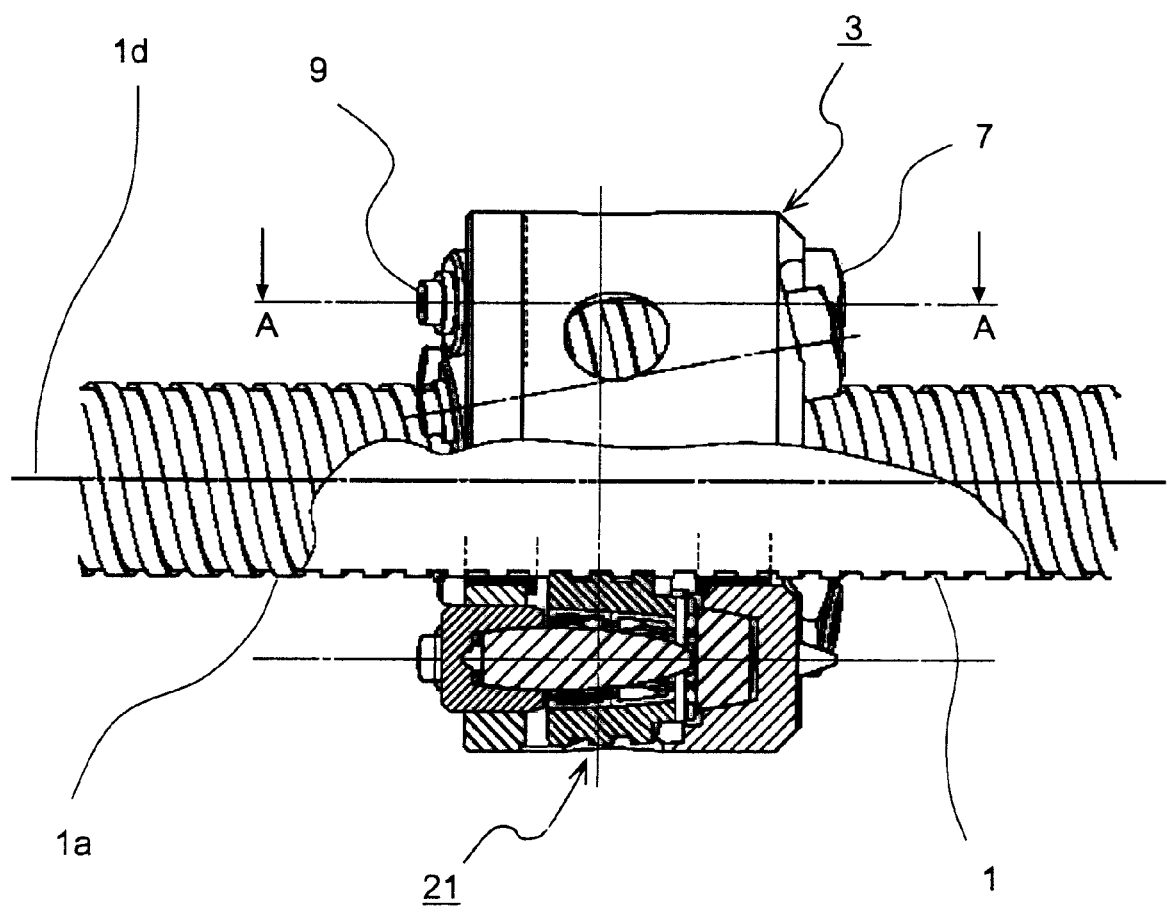
FIG. 1 is a diagram illustrating a rotational-to-linear motion conversion mechanism according to a first embodiment of the present invention.
Figure 2:
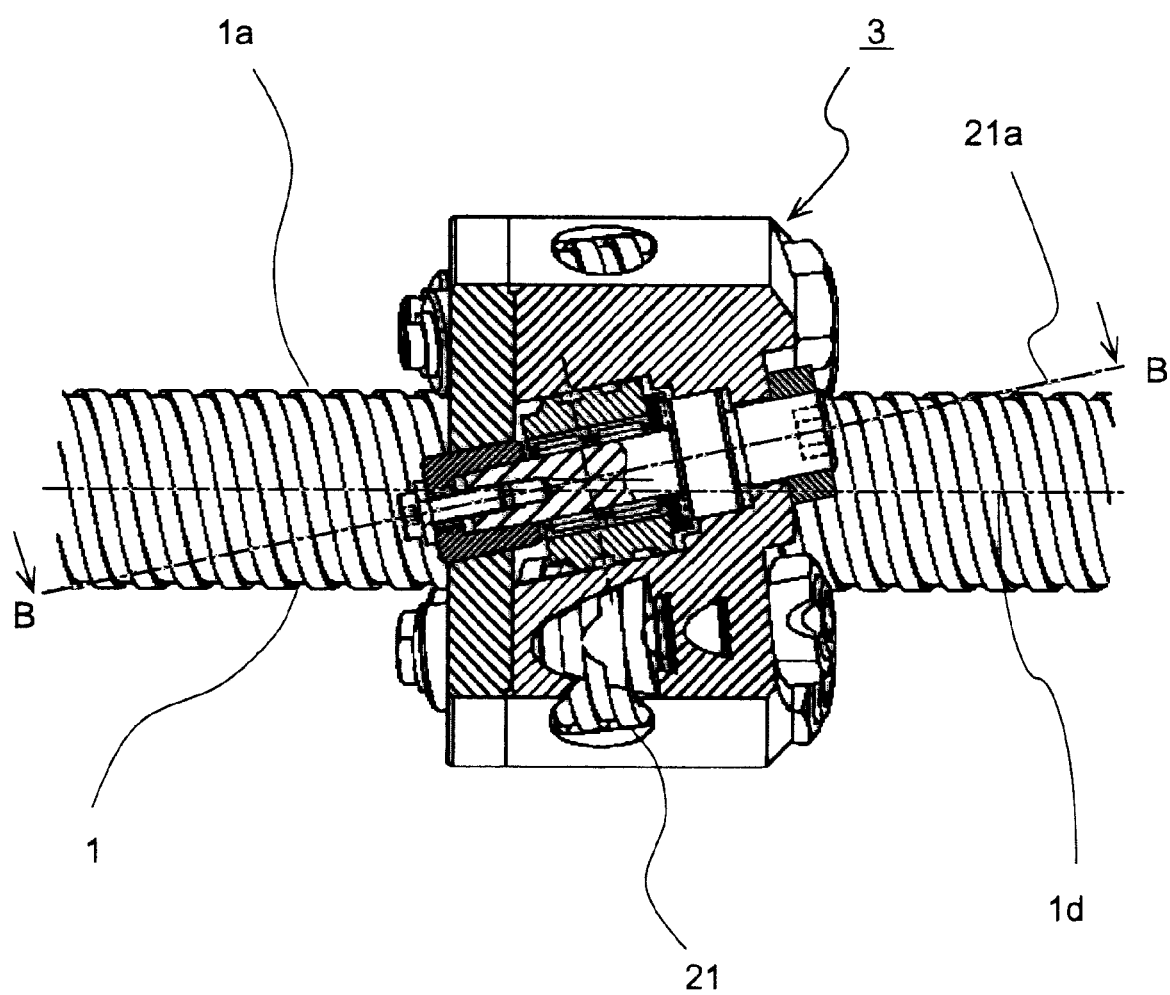
FIG. 2 is a sectional view taken along the A-A line in FIG. 1.
Figure 3:
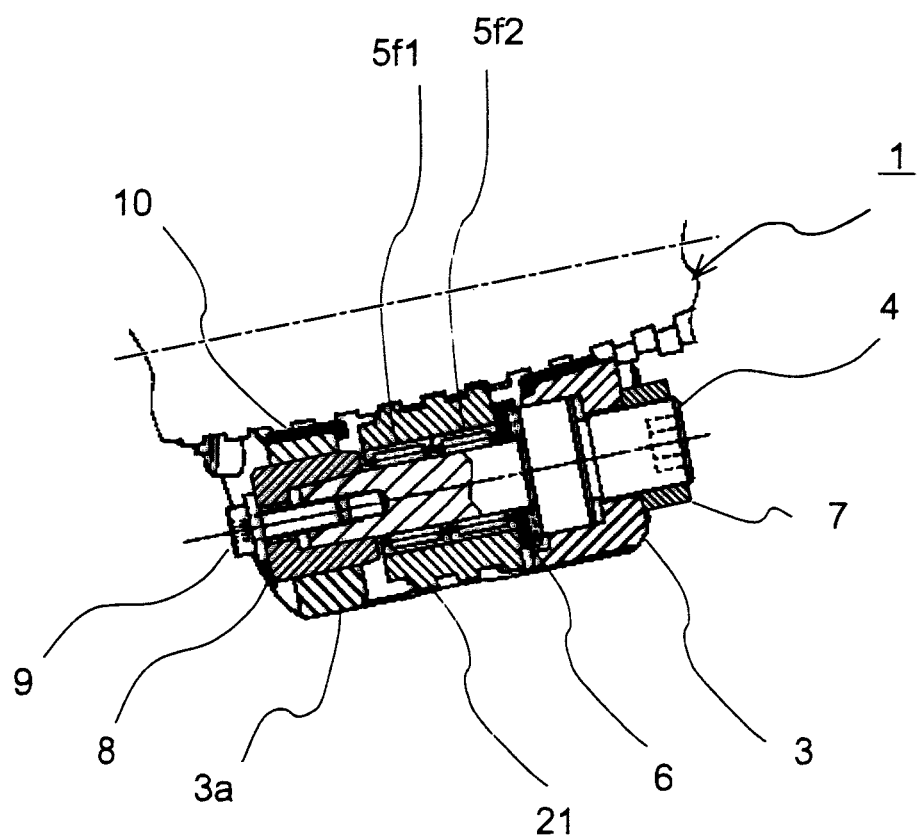
FIG. 3 is a sectional view taken along the B-B line in FIG. 2.
Figure 4:
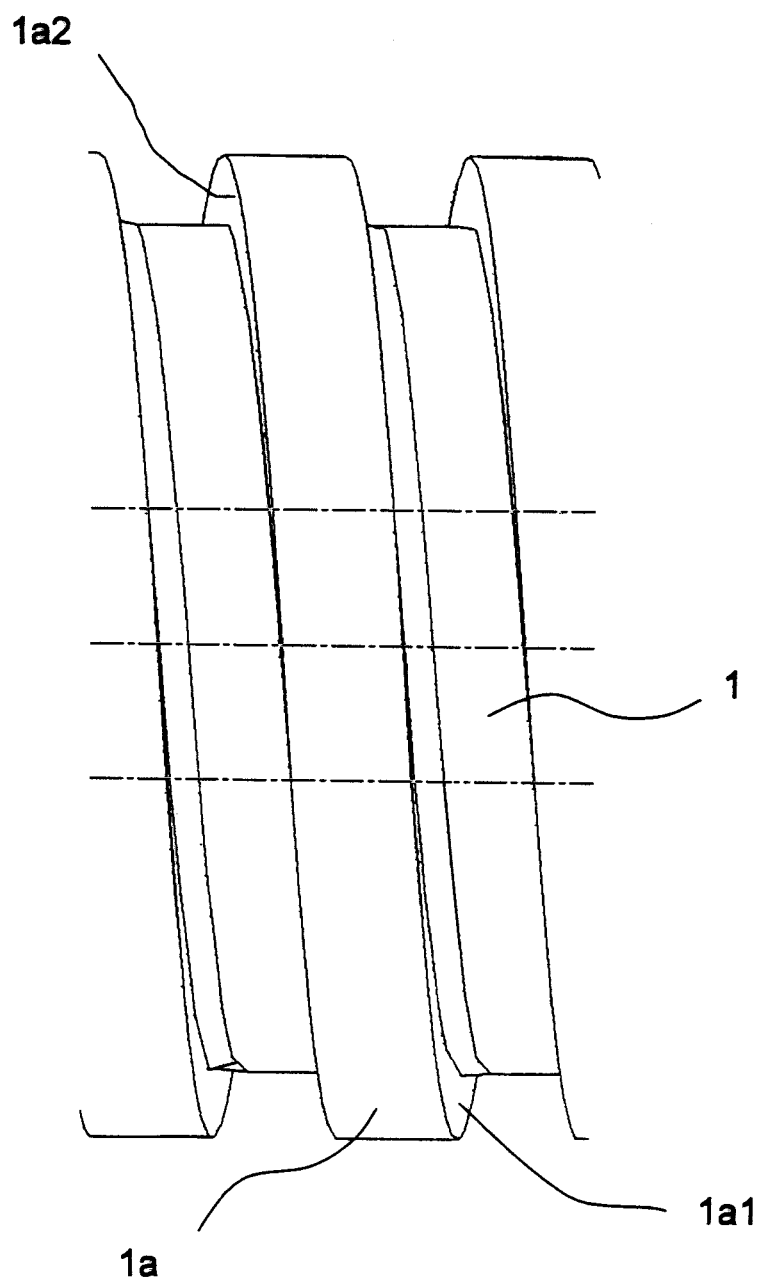
FIG. 4 is an enlarged view of a rack rod thread.
Figure 5:
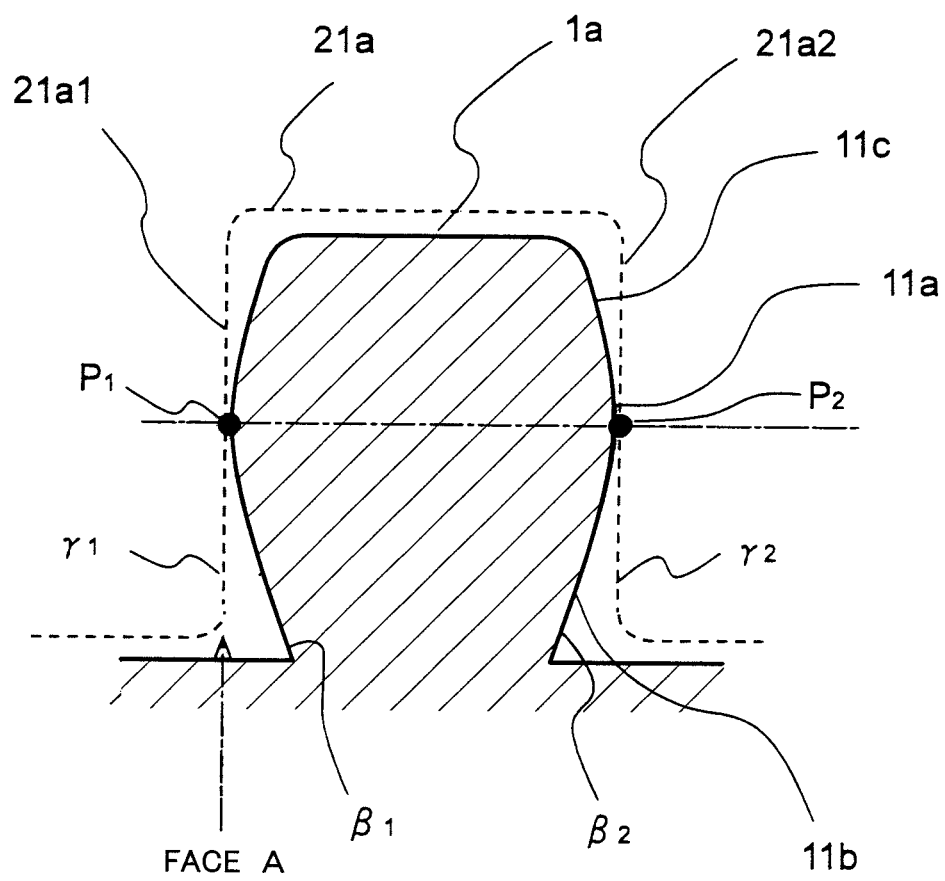
FIG. 5 is a diagram illustrating details of the shape of the rack rod thread.
Figure 6:
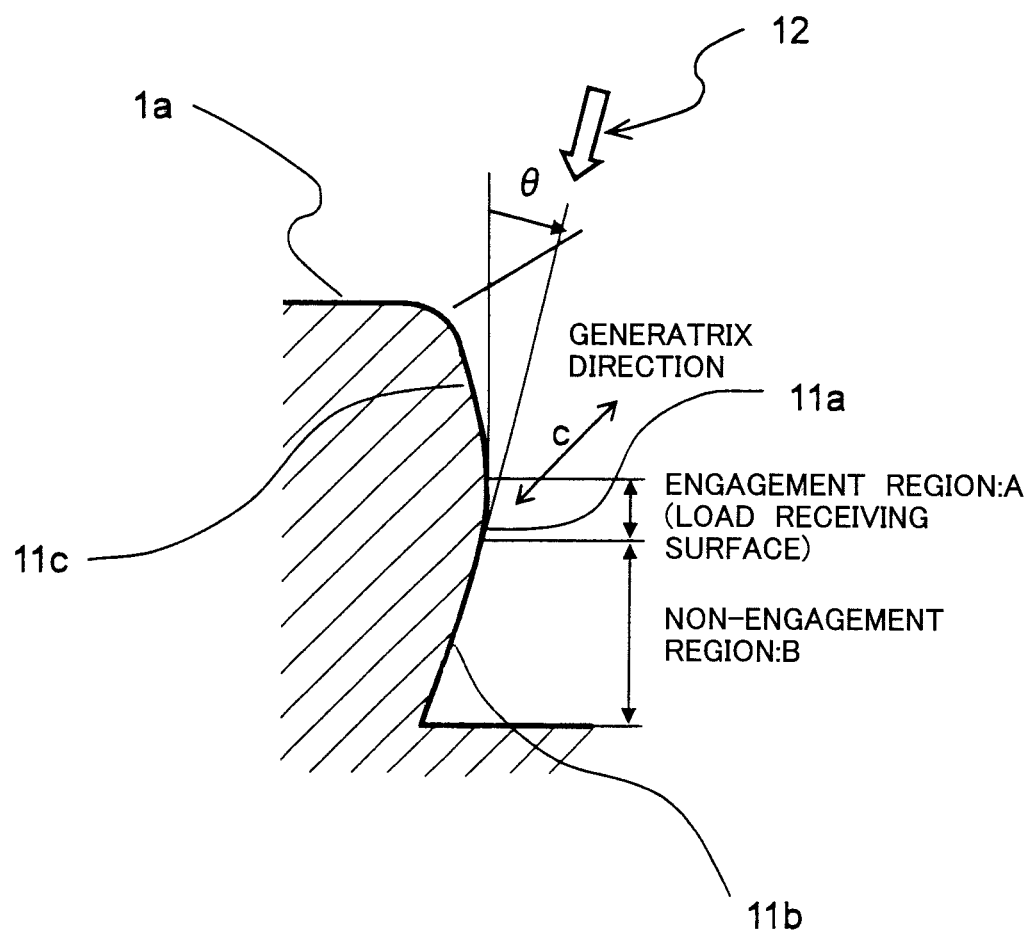
FIG. 6 is a diagram illustrating details of the shape of the rack rod thread.
Figure 7:
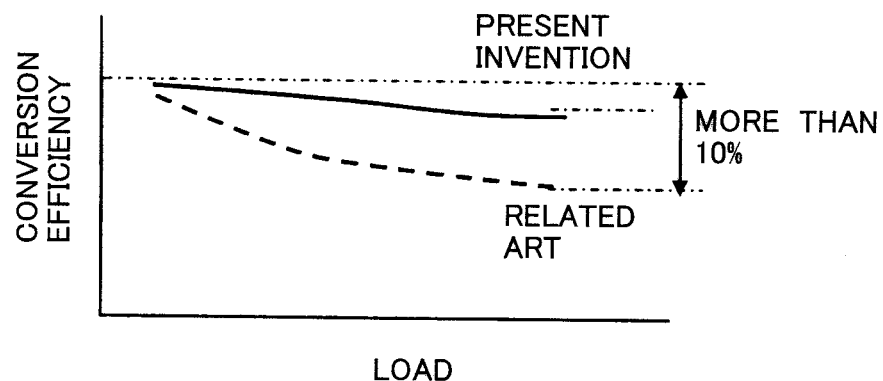
FIG. 7 is a diagram showing the relationship between a load and conversion efficiency.
Figure 8:
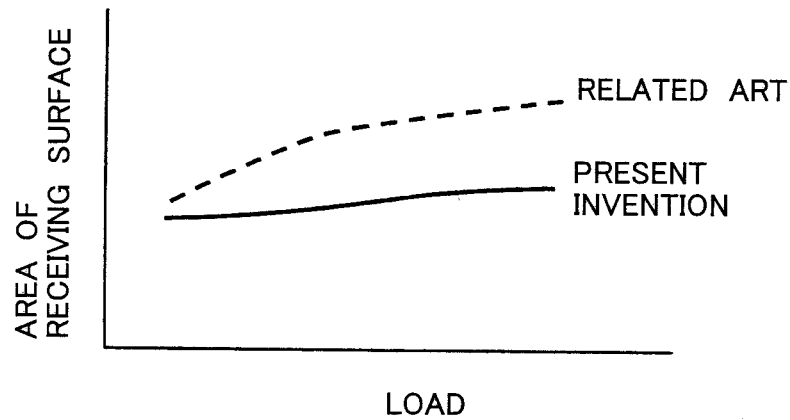
FIG. 8 is a diagram showing the relationship between a load and microdeformation (change in the area of the receiving surface)

FIG. 1 is a vertical sectional view illustrating the rotational-to-linear motion conversion mechanism according to a first embodiment of the present invention. FIG. 2 is a vertical sectional view (corresponding to section A-A in FIG. 1) of the rotational-to-linear motion conversion mechanism when viewed from the position rotated 90 degrees from the position in FIG. 1 (that is, as viewed from above in FIG. 1). FIG. 3 is a sectional view (corresponding to section B-B in FIG. 2) illustrating the relationship between a revolving roller and a holder member and also a detail diagram illustrating the engagement site. FIG. 4 is an enlarge view of a rack rod thread. FIG. 5 and FIG. 6 are diagrams detailing the shape of the rack rod thread which is the engagement surface according to the embodiment of the present invention. FIG. 7 is a diagram showing the relationship between a load and conversion efficiency. FIG. 8 is a diagram showing the relationship between a load and microdeformation (change in the area of the receiving surface).

The structure of the rotational-to-linear motion conversion mechanism according to the embodiment is described at the start. The relationship between a holder 3 and a plurality of revolving rollers 21 forming part of the rotational-to-linear motion conversion mechanism is described with reference to FIG. 3. As illustrated in FIG. 3, each of the revolving rollers 21 is situated in a middle portion of a roller shaft 4. A radial bearing 5 (revolving-roller radial bearings 5/1, 5/2) is disposed between the outer peripheral face of the roller shaft 4 and the inner peripheral face of the revolving roller 21 which is disposed on the outer periphery of the radial bearing 5. A thrust bearing 6 (revolving-roller thrust bearing) supporting the revolving roller 21 is interposed between the revolving roller 21 and a larger-diameter portion of the roller shaft 4. The right end of the roller shaft 4 is fitted into the recessed receiving face of the holder 3 and secured with a nut 7.

On the left end of the revolving roller 21, the roller shaft 4 and a taper collar 8 for positioning (alignment) are fitted into an insertion hole formed in the left holder end plate 3a. The left end of the roller shaft 4 is secured to the left holder end plate 3a through the taper collar 8 with a bolt 9. A metal bearing 10 is pressed into and fixed to the holder 3.

In this manner, a plurality of revolving rollers 21 can be placed in an angled position and mounted within the holder 3. Thus, the holder end plates 3, 3a in which the ends of each revolving roller 21 are journalled are coupled to form a holder assembly.

In the holder assembly, as illustrated in FIG. 2, the center axis (revolving-roller axis) $21d$ of the revolving roller 21 is placed at an axial angle approximately equal to the lead angle of the rack rod thread $1a$ (see FIG. 4) with respect to the center axis (rack-rod axis) $1d$ of the rack rod 1. The axial angle is dependent on the settings of the face of the thread $1a$ of the rack rod 1 and the face of a ring-shaped groove $21a$ of the revolving roller 21 which is engaged with the thread $1a$.

An axial position of a ring-shaped groove of the revolving roller in the mechanism assembly process is determined by the amount of shift of each revolving roller 21, the thickness of the revolving-roller thrust bearing 6, the mounting position of the roller shaft 4 in the axis direction to which the thrust bearing 6 is attached, and the like. For this reason, a simple increase in the accuracy of the dimensions of those components or their mounting positions is inadequate to ensure the positioning accuracy in the axis direction in the mechanism assembly process including forming of ring-shaped grooves in the revolving roller 21 (because of accumulation of errors).

To avoid this, in the embodiment a mounting screw for the revolving roller 21 is adapted as mounting place of the revolving roller 21 and the holder 3, and then the revolving-roller thrust bearing 6 provided with this screw is rotated in order to adjust the position of the revolving roller 21 in the axis direction.

Thus, the rack rod 1 is screwed into the sub-assembly of the revolving rollers 21 and the holder member 3, so that rack rod thread $1a$ and the ring-shaped grooves $21a$ of the revolving rollers 21 are engaged with each other. Then, the axial position of each of the revolving rollers 21 is adjusted in order to readily rotate the rack rod 1.

An angular contact ball bearing or a taper roller bearing having functions as a radial bearing and a thrust bearing may be used for the a bearing for rotationally supporting the revolving roller 21. A double row angular contact ball bearing may be used for each of the bearings. Instead, a bearing having alignment properties may be used. In this case, the bearing mounting accuracy required can be reduced. In the above assembly process, grease and/or the like is pumped into between components as appropriate.

Next, a description will be given of a method for making a ring-shaped groove face $21a$ of the revolving roller 21 and the surface shape of the rack rod thread $1a$ which form an engagement place (see FIG. 4 to FIG. 8).

In FIG. 4, the left face of the thread is referred to as a left rack-rod thread flank $1a1$, while the right face is referred to as a right rack-rod thread flank $1a2$. Regarding the engagement faces of each ring-shaped groove $21a$ of each revolving roller 21 engaged with the flanks $1a1$, $1a2$, in the sense that the left rack-rod thread flank $1a1$ is engaged with a left face (when viewed from the same direction as the direction when the rack rod thread is viewed), collectively, the left face is referred to as a left revolving-roller ring-shaped groove face $21a1$, and the other face as a right revolving-roller ring-shaped groove face $21a2$.

In the following, as long as there is no ambiguity, the revolving-roller ring-shaped groove faces $21a$ will be described using a specific ring-shaped groove as a representative. The same description on the specific ring-shaped groove can apply to the other ring-shaped grooves.

First, an engagement set plane is provided for each thread flank, and a section outline is defined on each face. The engagement set plane is defined as a face which is parallel to a plane passing through the rack rod axis $1d$ and is located at a certain distance.

The thread in the embodiment has two faces, the left rack-rod thread flank $1a1$ and the right rack-rod thread flank $1a2$. Because of this, two engagement set planes must be defined in general.

The embodiment describes on the assumption that the distance of the two engagement set planes is zero. As a result, the two engagement set planes are contracted into one. This contracted engagement set plane is referred to as an engagement set plane A.

Next, as illustrated in FIG. 5, on the engagement set plane A are rendered a thread section outline β (properly describing, a left line β1 and a right line β2 of the vertical line alone) of the rack rod 1 having the same period as that of the lead of the thread of the rack rod 1 which determines a speed reduction rate of the mechanism, and a ring-shaped groove section outline γ (properly describing, a left line γ1 and a right line γ2 of the vertical line alone) of the revolving roller 21 making contact with the thread section outline β. The β1 and γ1 are curves, which describe a flat surface and a convex making contact with each other in the embodiment, in which a common tangent at the contact point is perpendicular to the rack rod axis $1d$. The same applies to the case of the lines β2, γ2.

The contact points P1, P2 of the set lines β, γ result in engagement points of the ring-shaped groove faces of the revolving roller 21 and the thread flanks of the rack rod 1.

For creation (producing/formation) of a thread flank of the rack rod 1, the left thread section outline β1 of the rack rod 1 is swept (grinding) along a left rack-rod thread spiral in order to create the left rack-rod thread flank $1a1$.

Likewise, the right thread section outline β2 of the rack rod 1 is swept along a right rack-rod thread spiral in order to create the right rack-rod thread flank $1a2$.

The groove bottom can be created by joining the lower ends of the lines β1, β2 by a line which does not describe a convex (or a straight line), and by sweeping the line along the spiral. As a result, the left rack-rod thread flank $1a1$ and the right rack-rod thread flange $1a2$ are helicoids from a broad view, and each have a cylindrical side-face shape locally having no negative curvature in a section in any direction in proximity to the engagement site. In short, each flank $1a1$, $1a2$ has a convex curve face (the face having a minimum principal curvature of zero at most, not having a negative value).

As described in the embodiment, even when the section outline of the ring-shaped groove of the roller is a periodic line, the ring-shaped face shapes differ from each other depending on the distance from the closet point to the roller axis. Specifically, in the embodiment, as illustrated in FIG. 6, the angle of inclination of the thread side-face is increased to an arbitrary angle (for example, about 10 degrees) in a range from the engagement region A (corresponding to a portion $11a$ in FIG. 6, which is a tiny-width region forming a contact point to the ring-shaped groove formed on the right or left side of the thread) to the non-engagement region B ($11b$), that is, the thread is subjected to so-called undercutting.

In this manner, the thread is preferably machined and created such that the curvature of the non-engagement region B (11b) is greater than the curvature of the engagement region A (11a).

The thread is preferably created with different curvatures between the outer peripheral side and the inner peripheral side (the non-engagement region B) as compared with the curvature of the engagement region A (11a).

The thread is preferably created such that the curvature of the engagement region A (11a) and the curvature of the non-engagement region B (11b) are discrete.

FIG. 7 is a diagram showing the relationship between a load and conversion efficiency and FIG. 8 is a diagram showing the relationship between a load and microdeformation (change in the area of the receiving surface).

As shown in FIG. 7, the reduction in conversion efficiency as a load is increased is very small as compared with that of more than 10% in the related art. This is because an increase in the area of the receiving surface is inhibited irrespective of an increase in load as shown in FIG. 8, in turn inhibiting slip from occurring (being caused by multi-point contact) in the engagement site.

In the engagement site, a frictional force acts in the direction that eliminates relative slip, that is, in the direction of movement as one piece. The frictional force causes the revolving roller 21 to rotate on its axis such that the revolving-roller ring-shaped groove 21a rolls on a rail which is the thread of the rack rod 1. In this case, an importance is that, even when the revolving roller 21 rotates on its axis, the revolving roller groove 21a does not move in the axis direction in the engagement site. This is because the revolving roller grooves 21a are not shaped in a screw form, but are ring-shaped grooves.

In this manner, the revolving roller 21 itself controls its revolving speed such that the sum of frictions is reduced in the full engagement site, resulting in a small loss.

Next, the operation in the engagement site will be described. As described earlier, the rack rod 1 is engaged with the revolving roller 21. Since the engagement conditions are the same in the right engagement face and the left engagement face, a description is given only the engagement between the left rack-rod thread flank 1a1 and the left revolving-roller ring-shaped groove face 21a1 in the embodiment.

Referring to FIG. 5, it is seen that the engagement site corresponds to a contact point of the left thread section outline β1 and the ring-shaped groove section outline γ1. Differently describing the creating method, an engagement site is determined such that, when the revolving roller axis 21d and the spiral on the thread flank passing through the engagement site are projected in the direction of the common normal of the revolving roller axis 21d and the rack rod axis 1d, the tangent to the spiral projection line at the projected point of the engagement site is orthogonal to the projection line of the central axis of the revolving roller. Then, two section outlines β1 and γ1 are determined such that a tangent to a convex face in the engagement site on the engagement set plane which is parallel to the rack rod axis 1d and the common normal and passes through the engagement site, extends at this contact point in the same direction as the common normal. Among them, the β1 line is swept along the engagement spiral to create a face. The face thus created is defined as a thread flank of the rack rod 1. Then, the γ1 line is rotated about the revolving roller axis to create a face. The face thus created is defined as a revolving-roller ring-shaped groove face.

In general, since, assuming that a section outline forming a thread face is a straight line, the minimum principal curvature becomes negative (the concave direction exists in plane), there is a risk of interference occurring in places except the engagement set site. In the embodiment, a local shape of an engagement face in proximity to the engagement set site is formed to be a cylindrical side-face (the minimum principal curvature is zero, and not negative). The generatrix directions relating to the thread and the groove (a direction of each of straight lines forming the engagement face: direction C in FIG. 6) are approximately aligned. Accordingly, an increase in Hertz stress can be inhibited, while accidental occurrence of interference in places except the engagement set site can be suppressed. As a result, the engagement conditions can be known with higher accuracy, thus improving the reliability.

Next, a second embodiment will be described with reference to FIG. 9. In the second embodiment, the thread of the rack rod 1 is triple thread. Six revolving rollers 21 are arranged at regular intervals and placed in the holder 3. Two locations for the axial set position of the ring-shaped groove 21a of the revolving roller 21 are required, so that the revolving rollers 21 are divided into two groups which are then placed in different locations from each other for assembly.

Figure 9:
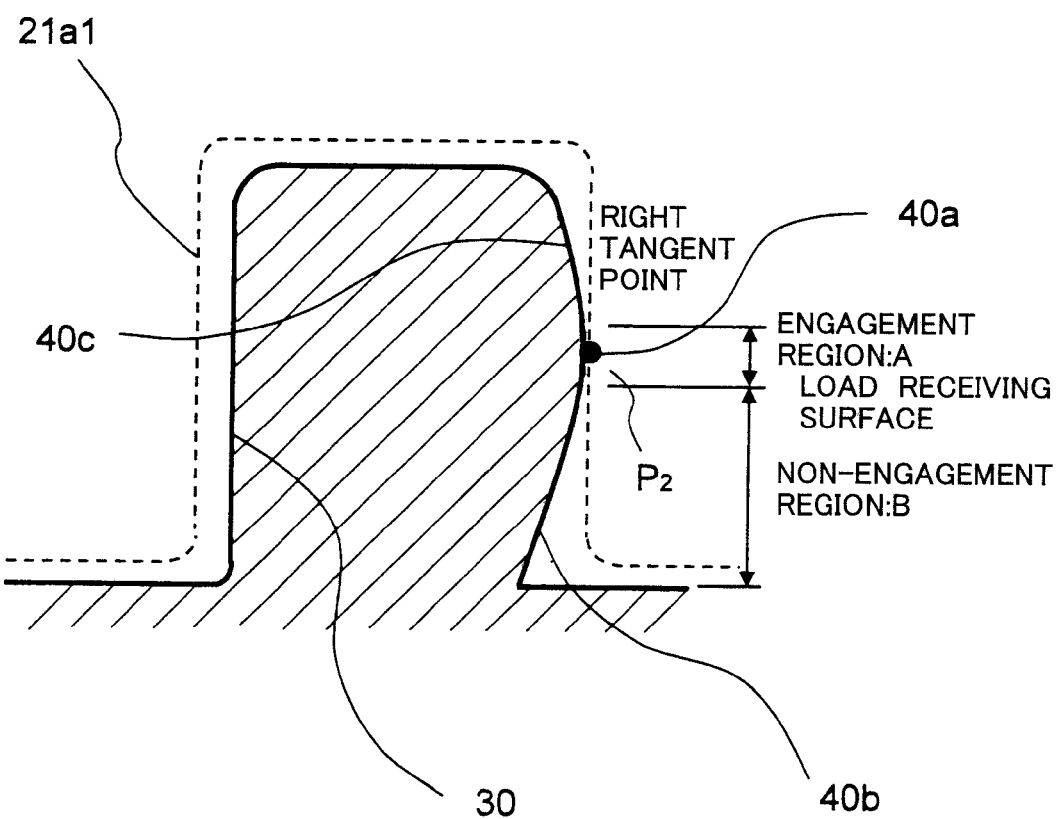
FIG. 9 is a diagram illustrating a second embodiment.

FIG. 9 is a sectional view of a roller and a rack rod 1 on the engagement set plane, in which the structure except for the fact that a left-side face 30 of the rack rod 1 has a straight line section is similar to that in the first embodiment, and the description is omitted.

The rotational-to-linear motion conversion mechanism according to the embodiment has a structure receiving a one-sided load, and is significantly effective when being applied to a load transporting machine such as a forklift truck. The rotational-to-linear motion conversion mechanism receives a load when a load is lifted up, and no load when it is lifted down. For this reason, a large gap is provided in a side face of the roller ring-shaped groove.

An embodiment according to the present invention has an advantage in its suitability for use in an electric power steering system as a rack assist mechanism 107 imparting an assist force for a linear motion to the rack rod 1 by using a motor as a rotation drive source.

Figure 10:
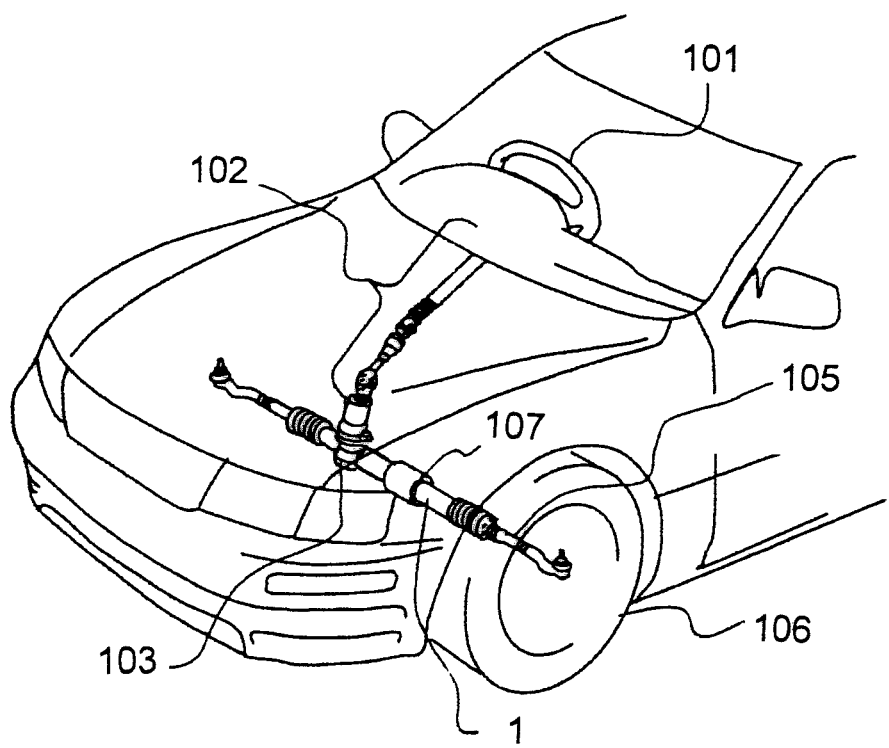
FIG. 10 is an exemplary diagram illustrating the application to an electric power steering system.

FIG. 10 is a diagram showing an example of applications of an embodiment of the present invention to the electric power steering system. FIG. 10 shows a power steering system used for a passenger vehicle in the mainstream at present, which is of a rack-and-pinion type. The essential components include a steering wheel 101, a steering column 102 serving as a rotating shaft of the steering wheel 101, a pinion 103 mounted at the lower end of the steering column 102, a rack rod 1 having a rack meshing with the pinion 103 (the rod itself may be referred to as a "rack", but is referred to as a "rack rod" in the present invention), and a tie rod 105 having one end connected to each end of the rack rod 1 and having the other end operating a steered wheel 106.

By providing the structure, the driver turns the steering wheel 101, whereupon the steering column 102 rotates, and then the pinion 103 located at the lower end of the steering column 102 rotates. Upon the rotation of the pinion 103, the rack rod 1 linearly moves in the axis direction because of the rack meshing with the pinion 103, and then the tie rods 105 connected to the rack rod 1 moves for steering. The power steering system is a system for assisting any of the components to reduce the force of the driver turning the steering wheel 101.

In recent years, the power steering system is essential equipment for vehicles. In particular, as with all vehicles, electric power assist steering has been recently in the mainstream instead of hydraulic power assist steering. The power steering systems contribute to energy conservation.

According to the embodiments of the present invention as described above, the following advantages can be listed.

1. A central shaft (roller shaft 4) integrated with the holder 3 is inserted into the center of the revolving roller 21, and the radial bearings are disposed inside the roller and not at both ends of a roller. This structure enables a reduction in the entire length of the mechanism.

As a result, in the process of manufacturing a roller assembly at a component assembly stage, all the bearings including the thrust bearing, requiring high accuracy of placement position, can be placed. This makes assembly adjustment easier.

2. A hole is formed at an angle in one end of the holder block for inserting the revolving rollers 21. A directly-coupled holder portion and an end plate are provided as one piece on the other end of the holder block. Thus, needless room can be eliminated to reduce the volume. Also, since flying of injected grease can be inhibited, the amount of grease injected can be reduced.

3. The number of ring-shaped grooves formed in each revolving roller is decreased to three to shorten the length of the roller, resulting in a reduction in the entire length of the mechanism. The number of rollers disposed around the rack screw axis 1*d* is increased to the maximum number (6 rollers) to ensure the total number of grooves and the need for performing heat treatment on the rollers is eliminated, resulting in a reduction in cost.

Since the shape of the left-side face of the rack rod is made simple, it is possible to perform usual machining such as rolling techniques and the like, resulting in a reduction in manufacturing cost. Also, a gap between the rack rod and the corresponding face of the revolving roller can be increased, so that they can came out of contact. Accordingly, the manufacturing costs can be further reduced. In addition, since an increase in accuracy of an interval between important ring-shaped grooves is achieved, a loss in the engagement is reduced to improve the mechanism efficiency.

It should be understood by those skilled in the art that various modifications, combinations, sub-combinations and alterations may occur depending on design requirements and other factors insofar as they are within the scope of the appended claims or the equivalent thereof.

What is claimed is:

1. A rotational-to-linear motion conversion mechanism, comprising:
    a rack rod including thread formed on its outer peripheral face;
    a holder member provided on the outer periphery of the rack rod, rotating about the rack rod and moving in the axis direction; and
    revolving rollers rotatably supported in the holder member, each having ring-shaped grooves formed in its outer peripheral face to be engaged with the thread, and placed at an axis angle with respect to a center axis of the rack rod to allow the ring-shaped grooves to be engaged with the thread formed on the rack rod,
    wherein a contact face of the thread with each of the ring-shaped grooves in an engagement site of the thread and the ring-shaped groove is formed as a convex face having different curvatures in a radial direction.

2. The rotational-to-linear motion conversion mechanism according to claim 1, wherein the curvatures of the contact face are set to a smaller curvature in an engagement region of the contact face of the thread and to a larger curvature in a region close to an inner periphery.

3. The rotational-to-linear motion conversion mechanism according to claim 1, wherein the curvature in an engagement region of the contact face and the curvature in a region closer to an inner periphery than the engagement region is located are discrete.

4. A rotational-to-linear motion conversion mechanism, comprising:
    a rack rod including thread formed on its outer peripheral face;
    a holder member provided on the outer periphery of the rack rod, rotating about the rack rod and moving in the axis direction; and
    revolving rollers rotatably supported in the holder member, each having ring-shaped grooves formed in its outer peripheral face to be engaged with the thread, and placed at an axis angle with respect to a center axis of the rack rod to allow the ring-shaped grooves to be engaged with the thread formed on the rack rod,
    wherein only one of contact faces of the thread with each of the ring-shaped grooves in an engagement site of the thread and the ring-shaped groove is formed as a convex face having different curvatures in a radial direction.

5. The rotational-to-linear motion conversion mechanism according to claim 4, wherein a direction of a load applied to between the rack rod and the holder member is a direction pressing one of the contact faces of the thread and ring-shaped groove against each other.

6. The rotational-to-linear motion conversion mechanism according to claim 4, wherein the curvatures of the contact face are set to a smaller curvature in an engagement region of the contact face of the thread and to a larger curvature in a region close to an inner periphery.

7. The rotational-to-linear motion conversion mechanism according to claim 4, wherein the curvature in an engagement region of the contact face and the curvature in a region closer to an inner periphery than the engagement region is located are discrete.

8. A method for manufacturing a rotational-to-linear motion conversion mechanism including:
    a rack rod including thread formed on its outer peripheral face;
    a holder member provided on the outer periphery of the rack rod, rotating about the rack rod and moving in the axis direction; and
    revolving rollers rotatably supported in the holder member, each having ring-shaped grooves formed in its outer peripheral face to be engaged with the thread, and placed at an axis angle with respect to a center axis of the rack rod to allow the ring-shaped grooves to be engaged with the thread formed on the rack rod,
    the method comprising the steps of:
    setting curvatures on a thread section outline in an engagement site of the thread and the ring-shaped groove to be larger in a portion of the thread section outline close to the inner periphery of the thread than the curvature in proximity to the engagement site; and
    sweeping and grinding the section outline along a thread spiral of the rack rod to form thread of the rack rod.

* * * * *